(12) United States Patent  
Naruse

(10) Patent No.: US 10,019,069 B2  
(45) Date of Patent: Jul. 10, 2018

(54) VEHICULAR DISPLAY INPUT APPARATUS

(71) Applicant: DENSO CORPORATION, Kariya, Aichi-pref. (JP)

(72) Inventor: Youichi Naruse, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/128,588

(22) PCT Filed: Mar. 12, 2015

(86) PCT No.: PCT/JP2015/001362  
§ 371 (c)(1),  
(2) Date: Sep. 23, 2016

(87) PCT Pub. No.: WO2015/146037  
PCT Pub. Date: Oct. 1, 2015

(65) Prior Publication Data  
US 2017/0102774 A1    Apr. 13, 2017

(30) Foreign Application Priority Data  
Mar. 27, 2014  (JP) ................................. 2014-066594

(51) Int. Cl.  
*G06F 3/01* (2006.01)  
*B60K 35/00* (2006.01)  
(Continued)

(52) U.S. Cl.  
CPC .............. *G06F 3/017* (2013.01); *B60K 35/00* (2013.01); *B60K 37/02* (2013.01); *B60K 37/06* (2013.01);  
(Continued)

(58) Field of Classification Search  
CPC ................... B60K 37/06; B60K 37/02; B60K 2350/1052; B60K 35/00; B60K 2350/352; G06F 3/013; G06F 3/017  
See application file for complete search history.

(56) References Cited

U.S. PATENT DOCUMENTS

2010/0324779 A1    12/2010   Takahashi et al.  
2013/0030811 A1*   1/2013   Olleon ................... B60K 35/00  
                                               704/267

(Continued)

FOREIGN PATENT DOCUMENTS

JP    2001216069 A    8/2001  
JP    2005135439 A    5/2005  
(Continued)

*Primary Examiner* — Abhishek Sarma  
(74) *Attorney, Agent, or Firm* — Harness, Dickey & Pierce, P.L.C.

(57) ABSTRACT

A vehicular display input apparatus includes a gesture detection unit, a determiner, and a controller. The gesture detection unit detects a gesture made by a hand of the driver. The determiner determines whether a visual line of the driver is directed within a visual line detection area, which is preliminarily defined to include at least partial display region. The controller switches to one of operations listed in an operation menu, which is to be correlated with the gesture, according to a determination result of the determiner. The determination result indicates whether the visual line is directed within the visual line detection area.

12 Claims, 11 Drawing Sheets

(51) Int. Cl.
*B60K 37/02* (2006.01)
*B60K 37/06* (2006.01)

(52) U.S. Cl.
CPC ...... *G06F 3/013* (2013.01); *B60K 2350/1052* (2013.01); *B60K 2350/352* (2013.01)

(56) References Cited

U.S. PATENT DOCUMENTS

| | | | | |
|---|---|---|---|---|
| 2013/0261871 | A1* | 10/2013 | Hobbs | B60K 37/06 701/28 |
| 2013/0307771 | A1* | 11/2013 | Parker | G06F 3/013 345/158 |
| 2014/0223384 | A1* | 8/2014 | Graumann | G06F 3/012 715/863 |
| 2015/0189241 | A1* | 7/2015 | Kim | H04N 7/181 348/148 |

FOREIGN PATENT DOCUMENTS

| | | |
|---|---|---|
| JP | 2006335112 A | 12/2006 |
| JP | 2011000957 A | 1/2011 |
| JP | 2012108385 A | 6/2012 |
| JP | 2013515309 A | 5/2013 |

* cited by examiner

VEHICULAR DISPLAY INPUT APPARATUS

CROSS REFERENCE TO RELATED APPLICATIONS

This application is a U.S. National Phase Application under 35 U.S.C. 371 of International Application No. PCT/JP2015/001362 filed on Mar. 12, 2015 and published in Japanese as WO 2015/146037 A1 on. Oct. 1, 2015. This application is based on and claims the benefit of priority from Japanese Patent Application No. 2014-066594 filed on Mar. 27, 2014. The entire disclosures of all of the above applications are incorporated herein by reference.

TECHNICAL FIELD

The present disclosure relates to a vehicular display input apparatus which is equipped to a vehicle, displays vehicle information in a display region, and enables a driver of the vehicle to input an operation by displaying information on the vehicle in a display region.

BACKGROUND ART

An operation menu set in an input device generally requires a driver to perform more than one operation. For example, in order to change a setting of an option, a user is required to select a target option from multiple options, determine the selection of the target option, and change detailed settings of the determined option. Thus, operations for selecting the target option and change the detailed settings of the selected option are required to be carried out by the user. As a configuration having an operation menu listing multiple operations each of which requires more than one operation by the user, an operation input device capable of detecting two types of gestures is described in, for example, Patent Literature 1. With the operation input device in Patent Literature 1, a driver performs a selection operation to select an operation mode with a first type gesture and performs a changing operation to change a parameter of the selected operation mode with a second type gesture.

According to a configuration of Patent Literature 1, two types of gestures made by the driver need to be distinguished from each other by the operation input device. Hence, a gesture of each type requires complex hand motion. It thus becomes difficult for the driver to make a gesture while holding a steering wheel and the driver has to move his hand off the steering wheel for a considerable time. In addition, because the driver is required to make complex gestures of two types, the driver's concentration may be distracted from vehicle driving for making the predetermined complex gestures.

PRIOR ART LITERATURE

Patent Literature

Patent Literature 1: JP 2005-135439 A

SUMMARY OF INVENTION

In view of the foregoing difficulties, it is an object of the present disclosure to provide a vehicular display input apparatus capable of reducing distraction of a driver's attention caused by an operation input during driving of a vehicle. Hereinafter, distraction of the driver's attention is referred to as driver's attention distraction.

According to an aspect of the present disclosure, a vehicular display input apparatus displays vehicle information in a display region and enables a driver of the vehicle to input an operation among multiple operations listed in an operation menu. The vehicular display input apparatus includes a gesture detection unit, a determiner, and a controller. The gesture detection unit detects a gesture made by a hand of the driver. The determiner determines whether a visual line of the driver is directed within a visual line detection area. The visual line detection area is preliminarily defined to include at least a part of the display region. The controller switches to one of the multiple operations listed in the operation menu, which is to be correlated with the gesture, according to a determination result of the determiner. The determination result indicates whether the visual line is directed within the visual line detection area.

In the vehicular display input apparatus configured as above, multiple operations, which are listed in the operation menu and correlated with the gestures of the hand of the driver, are switched depending on whether the visual line of the driver is directed within the visual line detection area. The driver is thus able to perform multiple operations with a simple gesture combined with a movement of the visual line. Consequently, the driver is capable of making a gesture while holding the steering wheel and driver's attention is less distracted during driving of the vehicle.

With the above-described configuration, during driving of the vehicle, the vehicle display input apparatus is capable of reducing driver's attention distraction caused by operation input to the display input apparatus.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, embodiments of the present disclosure will be described with reference to the drawings. When a component in one embodiment corresponds to a component in another embodiment, a description of such a component is omitted where appropriate by labeling a same reference symbol. In a case where an embodiment describes only a part of a configuration, the configuration already described in the other embodiments can apply to the rest. Besides a combination explicitly described in respective embodiments below, even when it is not described explicitly, the configurations of two or more embodiments can be combined partially unless any inconvenience arises from the combination. In addition, it should be understood that implicit combinations of the configurations in two or more embodiments and any modification described below are also disclosed herein by incorporation.

First Embodiment

Figure 1:
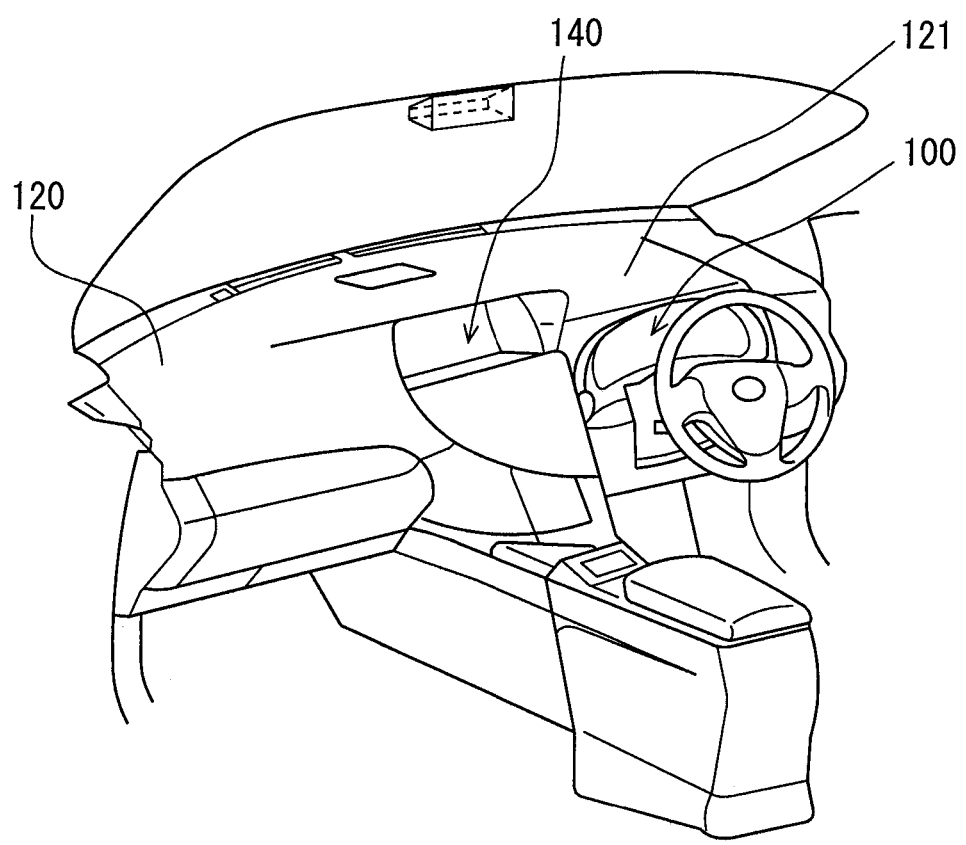
FIG. 1 is a diagram showing a perspective view of an inside of a vehicle to which a vehicular display input apparatus according to a first embodiment of the present disclosure is equipped.
Figure 2:
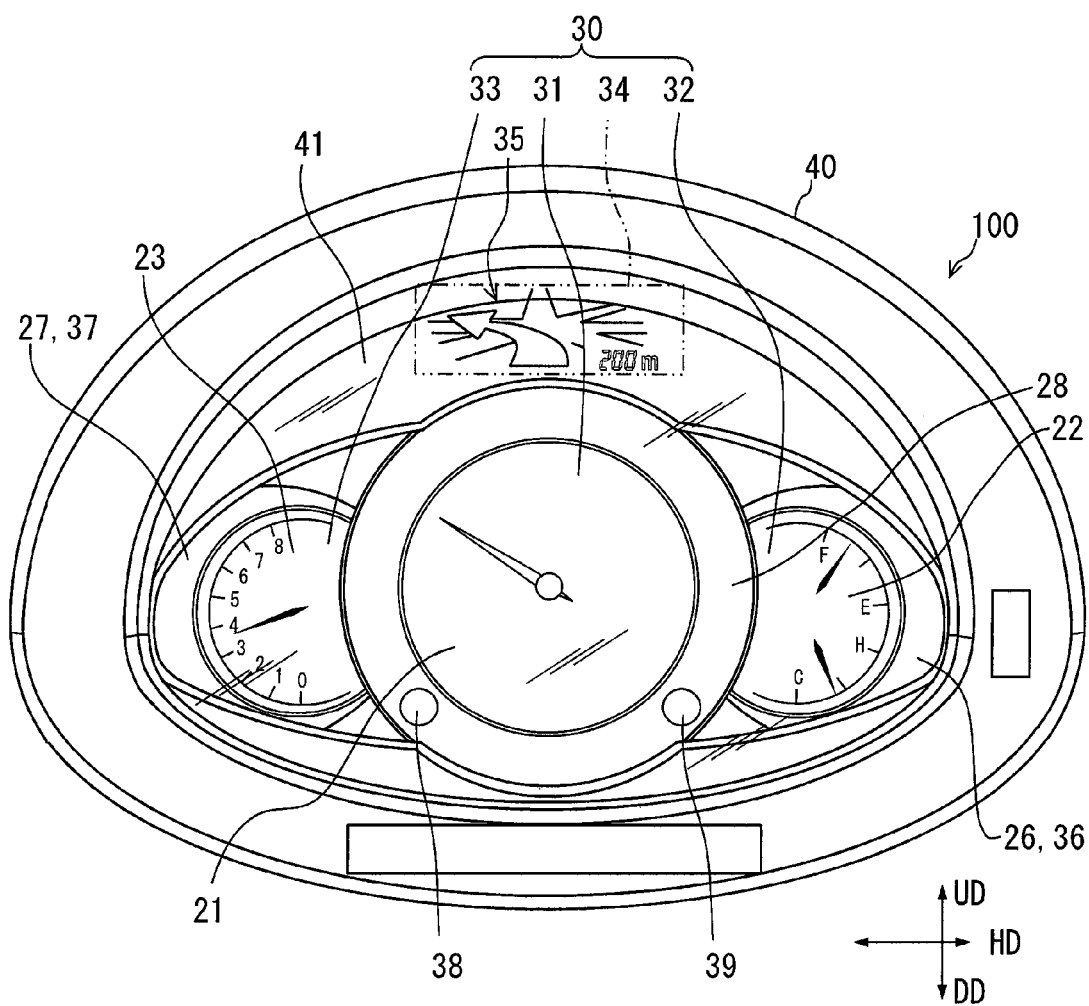
FIG. 2 is a diagram showing a front view of the display input apparatus.

A display input apparatus 100 according to a first embodiment of the present disclosure shown in FIG. 1 and FIG. 2 is a vehicular display device equipped to a vehicle to provide a driver with various types of information on the vehicle by displaying the information. In addition, the display input apparatus 100 is furnished with a function of a vehicular input device to accept an operation made by a user on an in-vehicle device 140. For example, the in-vehicle device 140 may be a navigation device equipped to the vehicle. The display input apparatus 100 is housed in a meter hood 121 of an instrument panel 120 as shown in FIG. 1 with a front side faced to a driver's seat. The front side is shown in FIG. 2.

The display input apparatus 100 displays information in a display region 30 which includes a central display portion 31, a right-side display portion 32, a left-side display portion 33, a projection display portion 34, and so on. Also, the display input apparatus 100 is provided with a right luminous region 36, a left luminous region 37, a visual line detection indicator 38, and a gesture detection indicator 39. In the following description, a direction along gravity in a stopped state of the vehicle is defined as a downward direction DD and a direction opposite to the downward direction DD is defined as an upward direction UD. Further, a direction substantially perpendicular to a direction of gravity along a display surface of the central display portion 31 is defined as a horizontal direction HD.

The central display portion 31 is located at a center of the display input apparatus 100. The central display portion 31 is shaped like a circle surrounded by an annular decorative ring 28. The central display portion 31 is sandwiched by the right-side display portion 32 and the left-side display portion 33 from both sides in the horizontal direction HD. The central display portion 31 includes a central display device 21 and displays various kinds of information images. The central display portion 31 displays, for example, a travel speed of the vehicle by a pointer-indication image.

The right-side display portion 32 is located on a right side of the central display portion 31 in the horizontal direction HD when viewed from the driver. The right-side display portion 32 is shaped like a partially missing circle. A major diameter of the right-side display portion 32 is set to be smaller than a major diameter of the central display portion 31. The right-side display portion 32 is surrounded by the right luminous region 36 and the decorative ring 28 along an outer periphery. The right-side display portion 32 includes a right-side display device 22 and displays various kinds of information images. The right-side display portion 32 displays, for example, a remaining amount of fuel and a water temperature by pointer-indication images.

The left-side display portion 33 is located on a left side of the central display portion 31 in the horizontal direction HD when viewed from the driver, that is, on an opposite side to the right-side display portion 32 with respect to the central display portion 31. A major diameter of the left-side display portion 33 is substantially equal to the major diameter of the right-side display portion 32. The left-side display portion 33 is surrounded by the left luminous region 37 and the decorative ring 28 along an outer periphery. The left-side display portion 33 includes a left-side display device 23 and displays various kinds of information images. The left-side display portion 33 displays, for example, a rotation speed of an output shaft of a travelling purpose engine equipped to the vehicle by a pointer-indication image.

The projection display portion 34 is located above the central display portion 31 in the upward direction UD when viewed from the driver. The projection display portion 34 is defined on a tinted cover 41 described below and has a rectangular shape that longitudinally extends in the horizontal direction HD. Light of a display image 35 is projected onto the projection display portion 34 by a projector 60 (see FIG. 5). For example, an image for route guidance to a destination set in a navigation device is displayed in the projection display portion 34 as the display image 35.

In the right luminous region 36, a right luminous ring 26 having a broken ring-like shape surrounds the right-side display portion 32. In the left luminous region 37, a left luminous ring 27 having a broken ring-like shape surrounds the left-side display portion 33. The right luminous ring 26 and the left luminous ring 27 are formed of colorless and transparent resin plate, such as acrylic resin plate. The right luminous ring 26 and the left luminous ring 27 are capable of illuminating lights, and capable of illuminating the right luminous region 36 and the left luminous region 37, respectively, so that a surface of each of the right luminous region 36 and the left luminous region 37 becomes uniformly illuminated.

The visual line detection indicator 38 and the gesture detection indicator 39, which are provided to the decorative ring 28, have circular shapes and light-transmittable configurations. Both of the indicators 38 and 39 are located below a center of the central display portion 31 in the downward direction DD and aligned side by side in the horizontal direction HD. Each of the indicators 38 and 39 becomes luminous by transmitting light toward the driver. Also, each of the indicators 38 and 39 is capable of emitting light in multiple colors.

A configuration of the display input apparatus 100 will now be described with reference to FIG. 3 through FIG. 5.

The display input apparatus 100 includes the central display device 21, the right-side display device 22, the left-side display device 23, the projector 60, a visual line detector 72, a gesture detector 74, an input and output circuit 70, and light sources 76 through 79. In addition, the display input apparatus 100 includes a casing 40 for housing the components described above.

Each of the central display device 21, the right-side display device 22, and the left-side display device 23 is provided by, for example, a liquid crystal display device having a TFT (Thin Film Transistor) display panel. The liquid crystal display device further includes a backlight to illuminate the display panel from a backside. Multiple pixels are arrayed on a display panel which functions as a display surface. By illuminating a color image draw on the display surface from the backside with the backlight, each of the display devices 21 through 23 is enabled to display various kinds of colored information images. The respective display devices 21 through 23 are connected to a controller 80. By driving individual pixels according to an image signal outputted from the controller 80, a series of information images can be displayed as a video in the respective display portions 31 through 33.

The projector 60 is a DLP (registered trademark, standing for Digital Light Processing) projector including a digital micro device (DMD) having a large number of micro mirrors and a projection light source projecting light toward the DMD. The projector 60 is connected to the controller 80 and attitudes of a large number of the micro mirrors included in to the DMD are controlled according to an image signal outputted from the controller 80. Light projected from the projection light source is reflected on the attitude-controlled DMD and projected onto the projection display portion 34 as light indicating the display image 35 (see FIG. 2). In this manner, a series of display images 35 are displayed on the projection display portion 34 as a video.

The visual line detector 72 is a sensor unit that detects a visual line of the driver. The visual line detector 72 includes a light-emitting element emitting near infrared light, an imaging element converting light in a wavelength band including near infrared light into an electrical signal, and so on. The visual line detector 72 is located below the central display portion 31 in the downward direction DD (see also FIG. 2). The visual line detector 72 is housed in the casing 40 at an attitude such that a detection target area STA (see FIG. 5) of the visual line detector 72 includes a range within which a face of the driver seated on the driver's seat is expected to be present. The light-emitting element emits near infrared light toward the detection target area STA. A part of the near infrared light emitted from the light-emitting element is reflected on the face of the driver or the like toward the imaging element. The imaging element converts the reflected light into an electrical signal and thereby successively generates near infrared images in which a range including eyes of the driver is captured. The visual line detector 72 successively outputs the near infrared images generated by the imaging element to the input and output circuit 70.

The gesture detector 74 is a sensor unit that detects a gesture of a hand or a finger F of the driver. The gesture detector 74 is located on an opposite side to the central display portion 31 with the right-side display portion 32 in between. The gesture detector 74 is capable of detecting a gesture within a preliminarily defined gesture detection area GSA (see FIG. 5). The gesture detection area GSA is defined so as to include a rim portion 111 of a steering wheel 110 provided to the vehicle.

The gesture detector 74 includes a light-emitting element emitting near infrared light, a light-receiving element detecting near infrared light, and so on. The light-emitting element emits near infrared light toward a range including the gesture detection area GSA. A part of near infrared light emitted from the light-emitting element is reflected on the finger F of the driver, the steering wheel 110, and so on toward the light-receiving element. The light-receiving element generates a detection signal indicating intensity of reflected light arriving at the light-receiving element. The gesture detector 74 outputs the detection signal generated by the detection element to the input and output circuit 70.

The input and output circuit 70 has a visual line conversion unit 73, an input conversion unit 75, a light source driving unit 81, an image output unit 71, and the controller 80.

The visual line conversion unit 73 is a calculator that calculates locations of eye points and a direction of the visual line of the driver by performing image analysis on a near infrared image obtained from the visual line detector 72. More specifically, the visual line conversion unit 73 specifies locations of the eyes of the driver based on the near infrared image. Also, the visual line conversion unit 73 detects locations of reflection images (Purkinje images) of the light-emitting element reflected on the eyes and locations of the pupils from an extracted image including the eyes and a peripheral region of the eyes. The locations of Purkinje images do not change substantially even when a direction of the visual line is changed. On the other hand, the locations of the pupils change when a direction of the visual line is changed. Hence, the visual line conversion unit 73 is capable of calculating a direction of the visual line on the basis of a relative positional relation between the Purkinje images and the pupils. The visual line conversion unit 73 successively outputs status information indicating whether the visual line is detected by the visual line detector 72, information indicating the specified locations of the eyes (eye point locations), and information indicating a direction of the visual line to the controller 80.

The input conversion unit 75 determines whether the finger F of the driver is within the gesture detection area GSA and whether a gesture of the finger F of the driver is made by analyzing a detection signal inputted from the gesture detector 74. More specifically, the input conversion unit 75 detects a motion of a finger F of the hand which holds the steering wheel 110 as a gesture of the driver. The input conversion unit 75 outputs status information indicating whether the finger F is detected by the gesture detector 74 to the controller 80. When a change in a signal waveform caused by a movement of the finger F is extracted from the detection signal, the input conversion unit 75 outputs, to the controller 80, information indicating that a gesture is made by the driver.

The light source driving unit 81 is connected to the respective light sources 76 through 79. The light source driving unit 81 controls a current to be applied to the respective light sources 76 through 79 according to a control signal obtained from the controller 80. The image output unit 71 is connected to the respective display devices 21 through 23 and the projector 60. The image output unit 71 generates images to be displayed on the respective display devices 21 through 23 and a base image of a display image to be projected from the projector 60 according to the control signal transmitted from the controller 80. The image output unit 71 outputs image data of the generated images to the respective display devices 21 through 23 and the projector 60.

The controller 80 includes a microcomputer which executes a program, an interface communicating with an in-vehicle LAN (Local Area Network) 130, and so on. The controller 80 acquires vehicle information, which is outputted to the in-vehicle LAN 130 from the in-vehicle device 140, such as a navigation device. The controller 80 also acquires various types of information. For example, the controller 80 acquires information indicating a direction of the visual line of the driver and information indicating whether or not a gesture is made by the driver from the visual line conversion unit 73 and the input conversion unit 75. The controller 80 generates a control signal to be outputted to the image output unit 71 and the light source driving unit 81 on the basis of the acquired information.

The controller 80 includes a determination block 82 as a functional block which is achieved by executing the program. The determination block 82 calculates a focus point of the visual line on the basis of the information on the eye point locations and a direction of the visual line acquired from the visual line conversion unit 73. Also, the determination block 82 determines whether the visual line of the driver is directed within a preliminarily defined visual line detection area 50.

The visual line detection area 50 is a virtual surface defined along the display surface of the central display portion 31 and defined so as to include at least a part of the display region 30. In the display input apparatus 100, two visual line detection areas 50, namely, a right visual line detection area 50r and a left visual line detection area 50l, are defined at different locations. The right visual line detection area 50r and the left visual line detection area 50l are defined at locations aligned side by side in the horizontal direction HD of the display region. The right visual line detection area 50r and the left visual line detection area 50l are also defined at locations spaced apart from each other in the horizontal direction HD.

The right-side display portion 32 and the right luminous region 36 are located within the right visual line detection area 50r. Also, the left-side display portion 33 and the left luminous region 37 are located within the left visual line detection area 50l. The projection display portion 34, the visual line detection indicator 38, and the gesture detection indicator 39 are located outside of both of the right visual line detection area 50r and the left visual line detection area 50l.

Each of the light sources 76 through 79 includes a group of light-emitting elements, such as light-emitting diodes. The respective light sources 76 through 79 are connected to the light source driving unit 81, and emit light under the control of the controller 80.

The right-ring light source 76 illuminates the right luminous region 36 by transmitting light to the right luminous ring 26. The light source driving unit 81 applies current to the right-ring light source 76 when the visual line of the driver is directed within the right visual line detection area 50r. In the manner as above, the right luminous region 36 is capable of notifying the driver that the visual line is detected within the right visual line detection area 50r.

The left-ring light source 77 illuminates the left luminous region 37 by transmitting light to the left luminous ring 27. The light source driving unit 81 applies current to the left-ring light source 77 when the visual line of the driver is directed within the left visual line detection area 50l. In the manner as above, the left luminous region 37 is capable of notifying the driver that the visual line is detected within the left visual line detection area 50l.

The visual line indicator light source 78 emits light toward the visual line detection indicator 38 to show the visual line indicator 38 in a luminous state. The visual line indicator light source 78 emits green light when the visual line is detected by the visual line detector 72 and the visual line conversion unit 73. When the visual line is not detected, the visual line indicator light source 78 emits orange light. In the manner as above, the visual line indicator 38 is capable of notifying the driver of whether or not the visual line is detected (tracked) normally by the color of emitted light.

The gesture indicator light source 79 emits light toward the gesture detection indicator 39 to show the gesture detection indicator 39 in a luminous state. The gesture indicator light source 79 emits green light when the finger F is detected by the gesture detector 74 and the input conversion unit 75. When the finger F is not detected, the gesture indicator light source 79 emits orange light. In the manner as above, the gesture detection indicator 39 is capable of notifying the driver of whether or not the finger F is detected normally by the color of emitted light. Colors of light emitted from the visual line indicator light source 78 and the gesture indicator light source 79 can be properly changed as needed. The colors of light emitted from the light sources 78 and 79 may be set different from one another.

Figure 4:
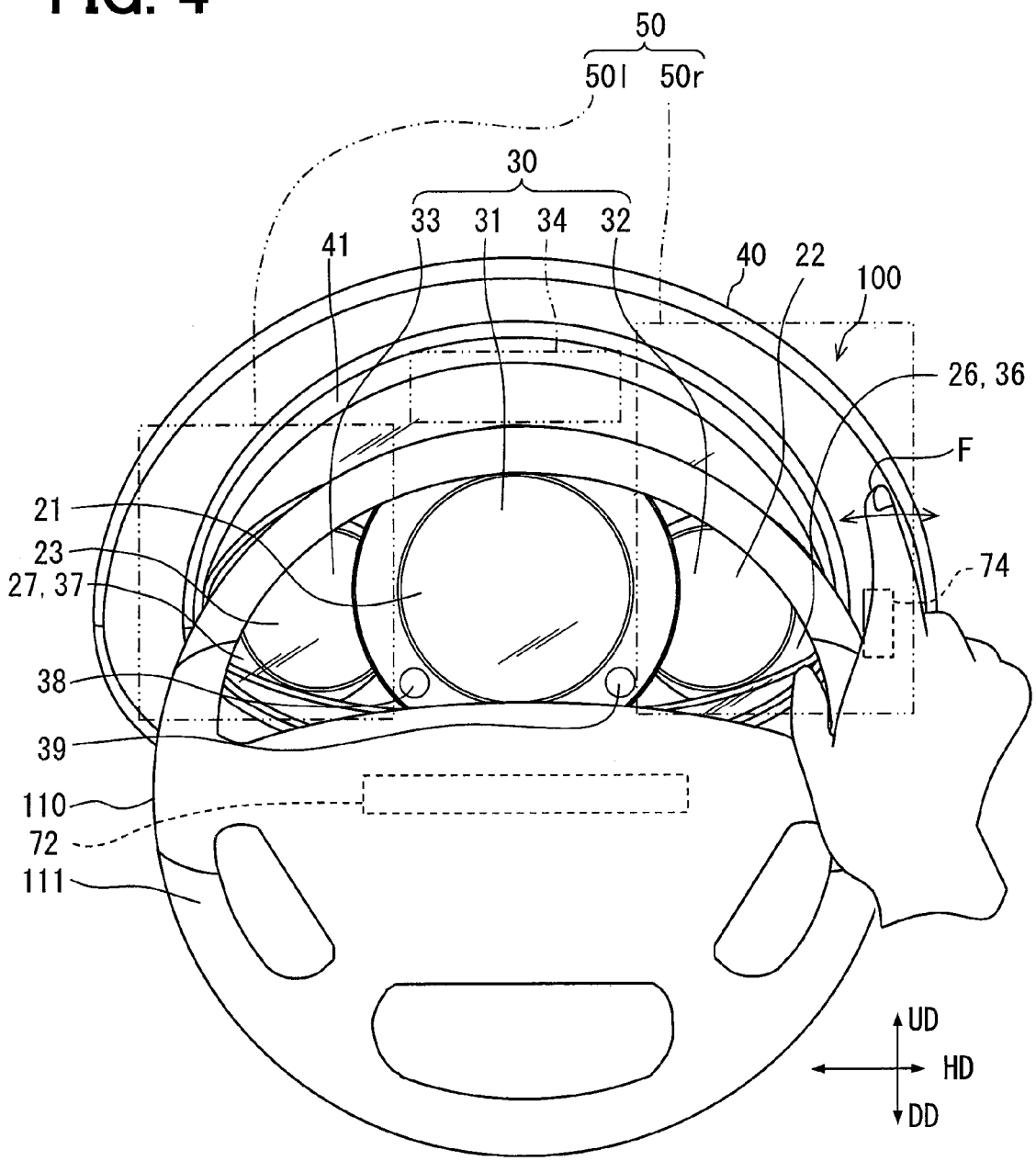
FIG. 4 is a diagram showing a positional relation among the display input apparatus, a steering wheel, and a finger of a driver, and locations of right and left visual line detection areas.
Figure 5:
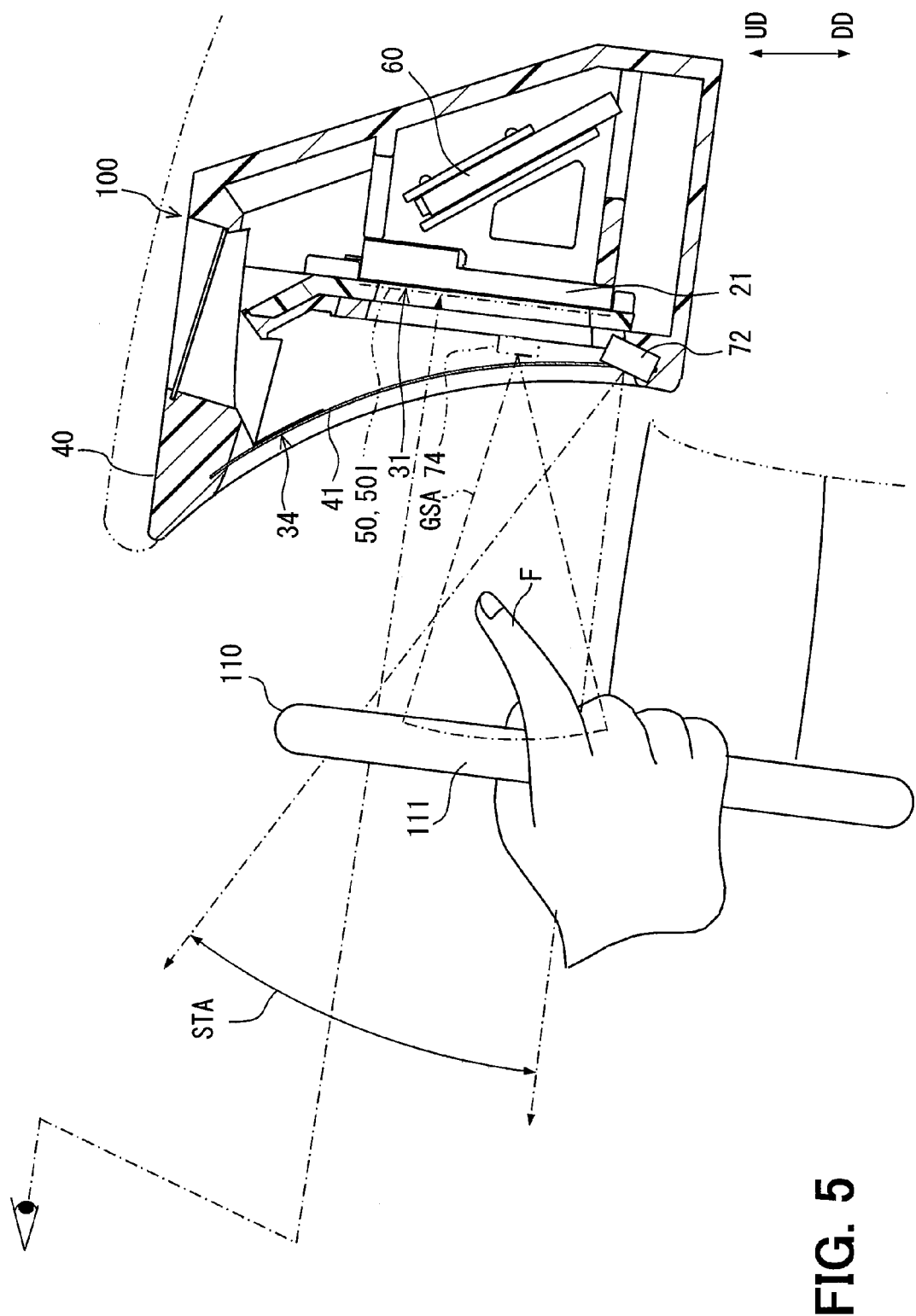
FIG. 5 is a diagram showing a positional relation among the display input apparatus, the steering wheel, and the finger of the driver, and locations of a detection target area and a gesture detection area.

The casing 40 shown in FIG. 4 and FIG. 5 is made of a resin material or the like and shaped like a container with an opening. The casing 40 houses the respective display devices 21 through 23, the projector 60, and so on. The tinted cover 41 is attached to the opening of the casing 40. The tinted cover 41 is made of a light-transmitting resin material and shaped like a curved plate. The tinted cover 41 provides the projection display portion 34. The tinted cover 41 prevents dust and dirt from entering into the casing 40 by physically closing the opening of the casing 40.

An operation method of an operation menu set in the display input apparatus 100 will now be described with reference to FIG. 6A through FIG. 6D and FIG. 7A through FIG. 7D. The operation menu is a list of options set in a graphic user interface via which the driver operates the display input apparatus 100 and various in-vehicle devices 140 (see FIG. 3). The operation menu includes multiple layers in a hierarchy. When any one of multiple options set in a higher layer is selected, switching takes place to a lower layer in which detailed settings or parameters of the selected option can be changed specifically. In FIG. 6A through FIG. 6D and FIG. 7A through FIG. 7D, an icon having an eye shape indicates a location of a focus point to which the visual line of the driver is directed. Also, the steering wheel 110 is omitted in the drawings to make displays in the respective display portions easy to see.

FIG. 6A through FIG. 6D show cases where the visual line of the driver is directed neither to the right visual line detection area 50r nor to the left visual line detection area 50l. In such cases, the controller 80 (see FIG. 3) correlates a detected gesture of the finger F to a selection operation in a higher layer in which a currently selected option can be switched to another in a predetermined sequence. When the currently selected option is switched by a gesture of the finger, a display mode is changed correspondingly and contents of displays in the projection display portion 34, the right-side display portion 32, and the left-side display portion 33 are also changed.

Figure 6A:
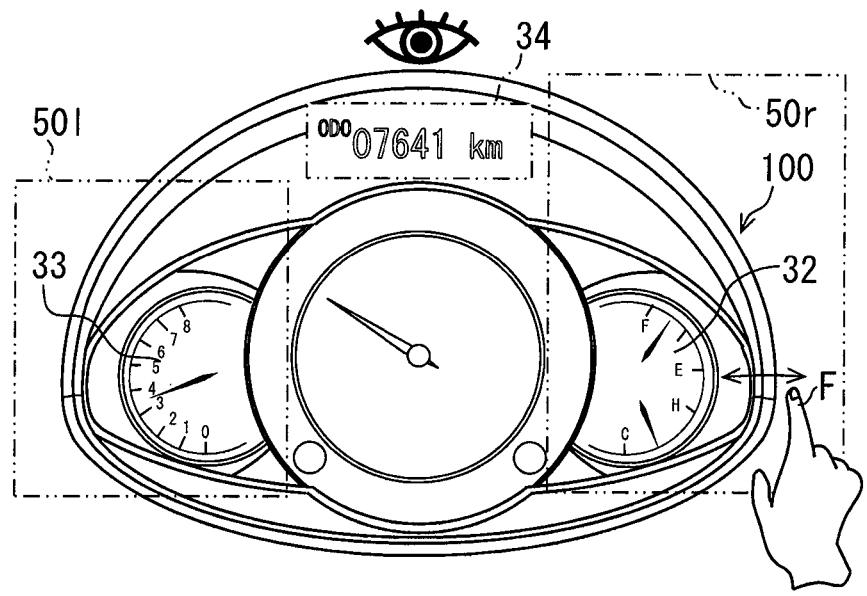
FIG. 6A is a diagram showing a normal display mode.

More specifically, in a normal display mode shown in FIG. 6A, a fuel indicator and a water temperature meter are displayed in the right-side display portion 32, and a tachometer is displayed in the left-side display portion 33. Also, an odometer is displayed in the projection display portion 34.

Figure 6B:
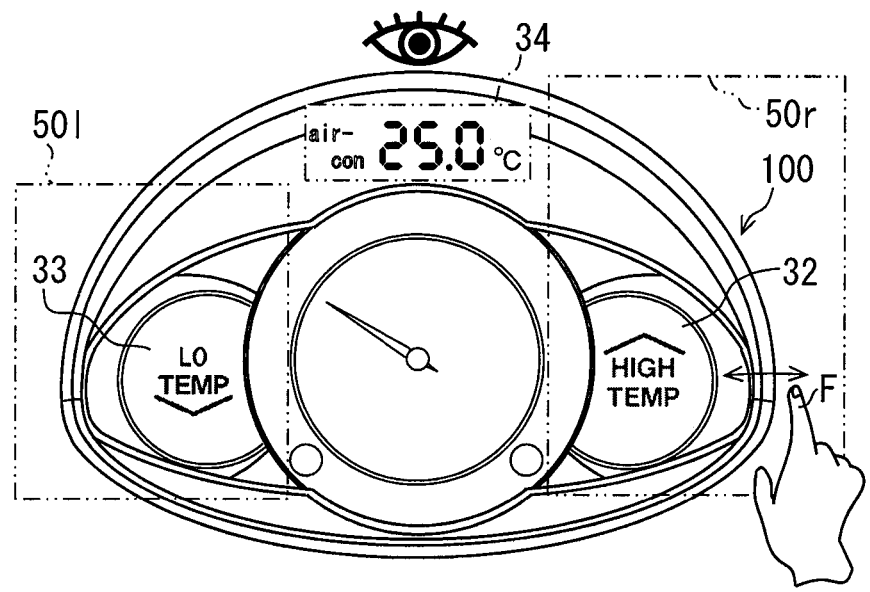
FIG. 6B is a diagram showing an air conditioner operation mode.

When a gesture is made in the normal display mode, the display mode switches to an air conditioner operation mode shown in FIG. 6B according to a predetermined sequence.

Figure 6C:
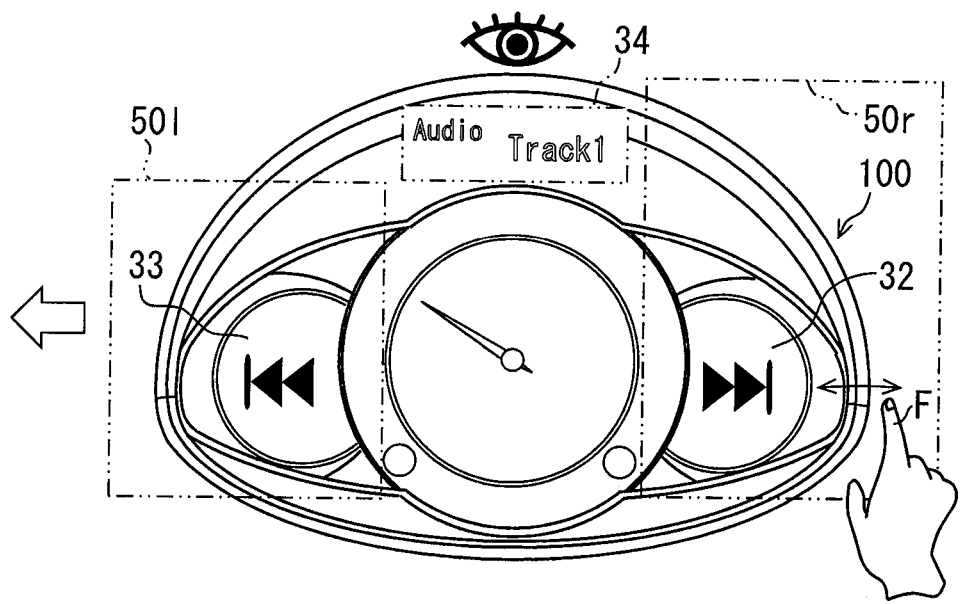
FIG. 6C is a diagram showing an audio operation mode.

In the air conditioner operation mode, an air-conditioning device equipped to the vehicle is an operation target and a preset temperature in the air-conditioning device is provided as an operable option. A current value of the preset temperature and a text "air-con" are displayed in the projection display portion 34. Changing operations in the air conditioner operation mode are displayed in the right-side display portion 32 and the left-side display portion 33. To be more specific, an image indicating a rise (increase) of the preset temperature is displayed in the right-side display portion 32. Further, an image indicating a drop (decrease) of the preset temperature is displayed in the left-side display portion 33. When a predetermined gesture is made in the air conditioner operation mode, the display switches to an audio operation mode as shown in FIG. 6C.

In the audio operation mode, an audio device equipped to the vehicle is an operation target and a track number of a song to be or being played by the audio device is an option. A current value of the track number and a text "Audio" are displayed in the projection display portion 34. An image indicating forwarding skipping (increase) of track numbers is displayed in the right-side display portion 32. Further, an image indicting backward skipping (decrease) of track numbers is displayed in the left-side display portion 33. When a gesture is made in the audio operation mode as above, the display switches to a map operation mode shown in FIG. 6D.

In the map operation mode, a navigation device is an operation target and a scale of a map displayed on the navigation device is an option. A current value of the scale and a text "Navi" are displayed in the projection display portion 34. An image indicating a change to a wide area map is displayed in the right-side display portion 32. Further, an image indicating a change to a detailed map is displayed in the left-side display portion 33. When a gesture is made in the map operation mode as above, the display switches to the normal display mode shown in FIG. 6A.

FIG. 7A through FIG. 7D show cases where the visual line of the driver is directed within the right visual line detection area 50r or the left visual line detection area 50l in the air conditioner operation mode (see FIG. 6B). In such cases, the controller 80 (see FIG. 3) correlates a detected gesture of the tip of the finger F with a changing operation in a lower layer in which a value of the preset temperature is changed. Also, when the preset temperature is changed by a gesture of the tip of the finger F, a numerical value displayed in the projection display portion 34 is changed correspondingly.

Figure 7A:
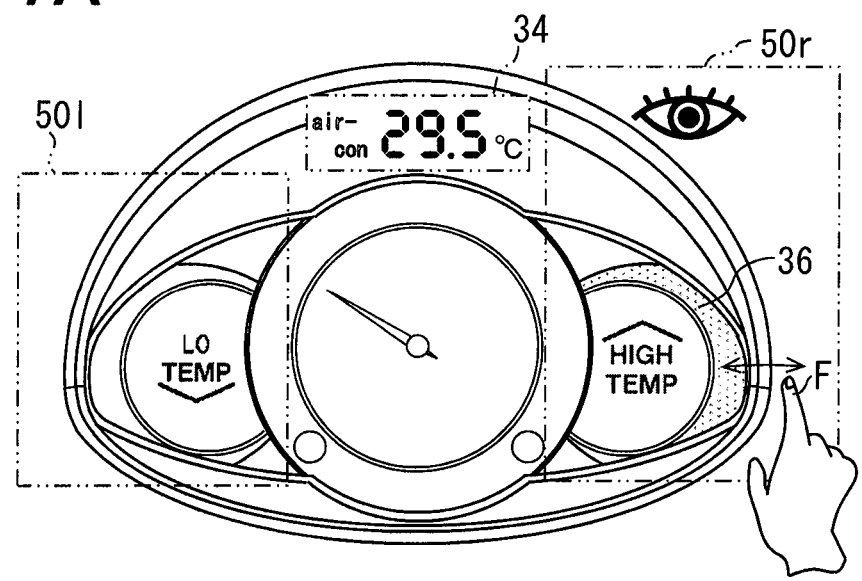
FIG. 7A is a diagram showing a part of operations of the display input apparatus when a changing operation is performed.

More specifically, when the visual line of the driver is directed within the right visual line detection area 50r as shown in FIG. 7A, the right luminous region 36 becomes luminous (indicated by dots) and an incremental changing operation to raise the preset temperature is made available. When a gesture of the finger F is made in the circumstance as above, the preset temperature is increased as shown in FIG. 7B.

Figure 7B:
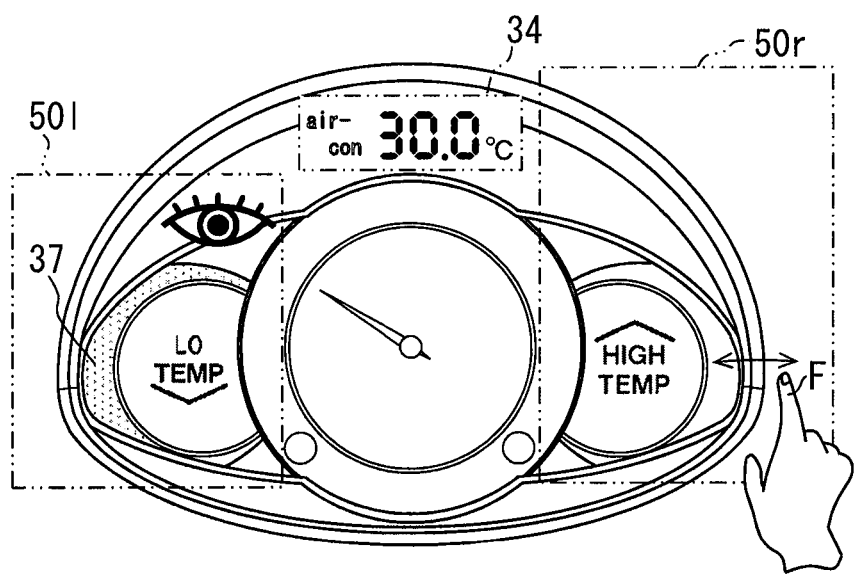
FIG. 7B is a view showing a part of operations of the display input apparatus when another changing operation is performed.
Figure 7C:
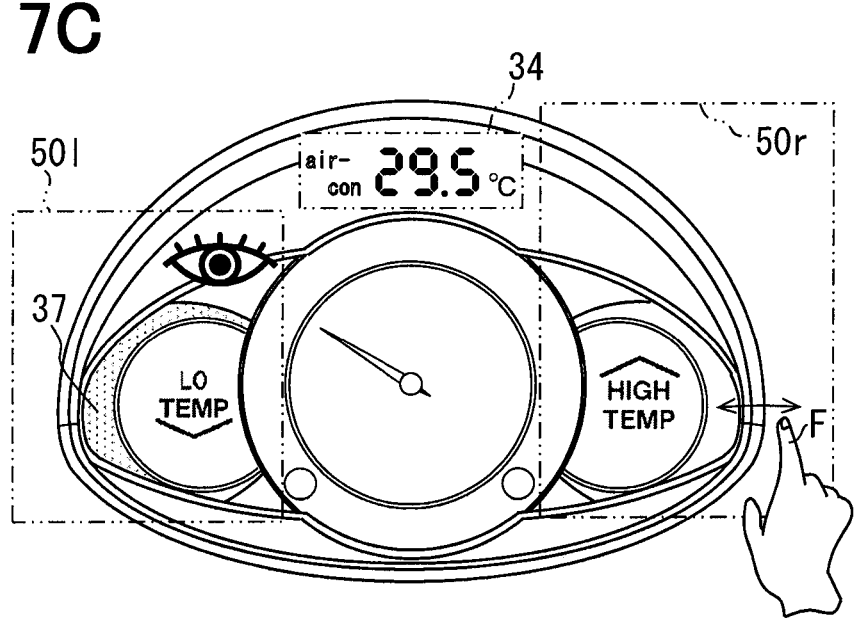
FIG. 7C is a view showing a part of operations of the display input apparatus when another changing operation is performed.
Figure 7D:
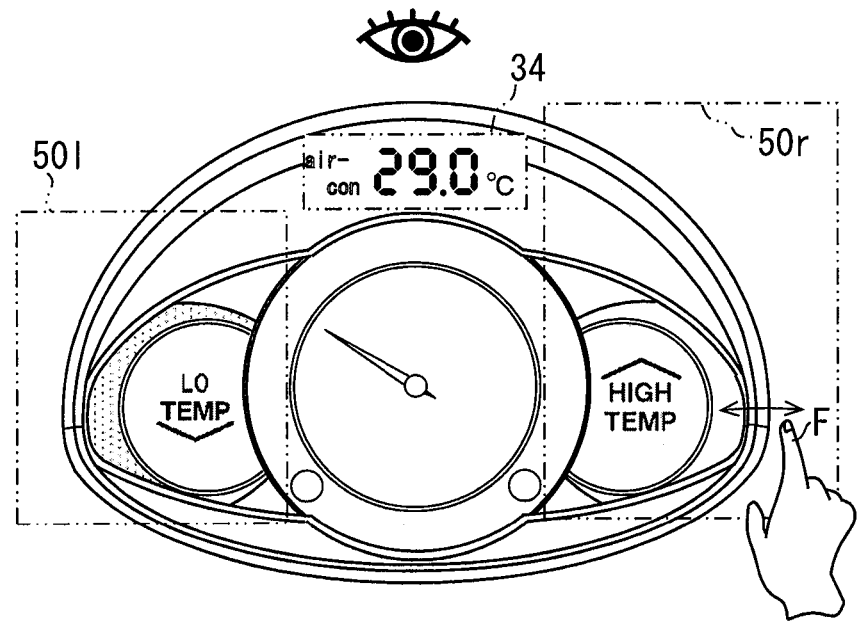
FIG. 7D is a view showing a part of operations of the display input apparatus when another changing operation is performed.

When the visual line of the driver is directed within the left visual line detection area 50l as shown in FIG. 7B, the left luminous region 37 becomes luminous (indicated by dots) and a decremental changing operation to decrease the preset temperature is made available. When a gesture of the finger F is made in the circumstance as above, the preset temperature is decreased as shown in FIG. 7C. When a gesture of the finger F is made further, the preset temperature is decreased further as shown in FIG. 7D. It should be noted that even after the visual line of the driver is moved to the outside of both of the visual line detection areas 50r and 50l, a decremental changing operation by a gesture is available for a predetermined period of time after the visual line of the driver is moved to the outside of both of the visual line detection areas 50r and 50l.

When the visual line of the driver is directed within the right visual line detection area 50r or the left visual line detection area 50l in the audio operation mode shown in FIG. 6C, a gesture of the finger F is correlated with a changing operation in a lower layer in which a currently playing track number is changed. More specifically, when the visual line of the driver is directed within the right visual line detection area 50r, an incremental changing operation to skip the currently playing track number to the next one is made available. On the other hand, when the visual line is directed within the left visual line detection area 50l, a decremental changing operation to skip the currently playing track number to the one before is made available.

Figure 6D:
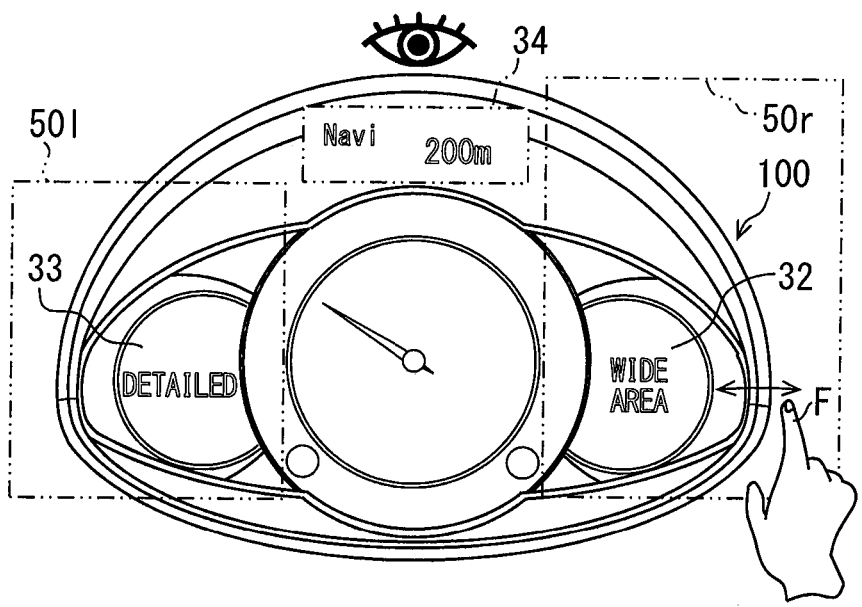
FIG. 6D is a diagram showing a map operation mode.

When the visual line of the driver is directed within the right visual line detection area 50r or the left visual line detection area 50l in the map operation mode shown in FIG. 6D, a gesture of the finger F is correlated with a changing operation in a lower layer in which a map scale is changed. More specifically, when the visual line of the driver is directed within the right visual line detection area 50r, an incremental changing operation to increase a map scale is made available. A zoomed-out wide area map is displayed by the incremental changing operation. On the other hand, when the visual line of the driver is directed within the left visual line detection area 50l, a decremental changing operation to reduce a map scale is made available. A zoomed-in detailed map is displayed by the decremental changing operation.

Figure 8:
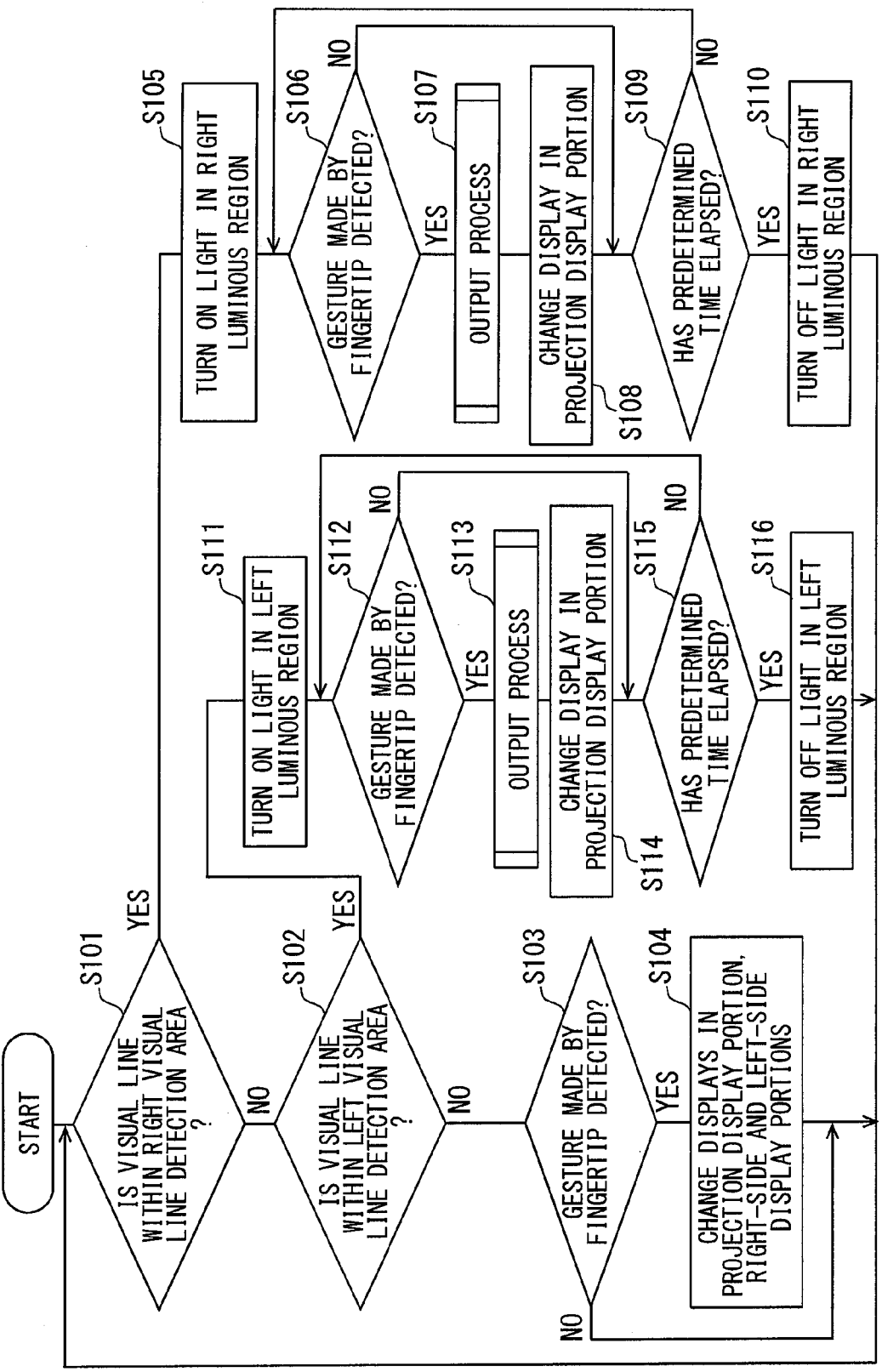
FIG. 8 is a flowchart showing a process performed by a controller to realize a series of operation inputs by combining a movement of a visual line and a gesture.

Process performed by the controller 80 to realize an operation input to the display input apparatus 100 will be described with reference to FIG. 8 and FIG. 3 through FIG. 5. The process shown in FIG. 8 is started by the controller 80 when an accessory power supply of the vehicle is turned on and a supply of power from a power-supply circuit of the vehicle to the display input apparatus 100 is started. The process is performed repetitively by the controller 80 until the accessory power supply is turned off.

In S101, the determination block 82 determines whether the visual line is directed within the right visual line detection area 50r. When a positive determination is made in S101 that the visual line is directed within the right visual line detection area 50r, the process proceeds to S105. When a negative determination is made in S101 that the visual line is not directed within the right visual line detection area 50r, the process proceeds to S102.

In S102, the determination block 82 determines whether the visual line is directed within the left visual line detection area 50l. When a positive determination is made in S102 that the visual line is directed within the left visual line detection area 50l, the process proceeds to S111. On the other hand, when a negative determination is made in S102 that the visual line is not directed within the left visual line detection area 50l, the process proceeds to S103. According to the negative determinations made in S101 and S102, a gesture is correlated with a selection operation. The driver thus becomes able to select an option from the multiple options included in the operation menu.

In S103, the determination block 82 determines whether a gesture made by the tip of the finger F is detected. When a negative determination is made in S103 that a gesture is not detected, the process returns to S101 without executing process in S104. On the other hand, when a positive determination is made in S103 that a gesture is detected, the process proceeds to S104. In S104, the gesture of the fingertip is correlated with a selection operation and the display switches to the option that is currently selected. At the same time, displays in the respective display portions 32 through 34 are changed corresponding to the switched option. Then, the process returns to S101.

In the process in and after S105 according to the positive determination in S101, a gesture of the fingertip is correlated with an incremental changing operation. In S105, the light source driving unit 81 starts to apply a current to the right-ring light source 76 so that the right luminous region 36 become luminous, and then the process proceeds to S106. In S106, the determination block 82 determines whether a gesture is detected similar to S103. When a negative determination is made in S106, the process proceeds to S109 without executing the process in S107 and S108. On the other hand, when a positive determination is made in S106, the process proceeds to S107.

In S107, the controller 80 performs output process to output an instruction signal, which instructs a change of the setting in the in-vehicle devices 140, to the in-vehicle LAN 130, and then the process proceeds to S108. Instruction commands outputted in the output process of S107 include an instruction command to instruct the air conditioning device to raise the preset temperature, an instruction command to instruct the audio device to skip the song being currently played to the next one, an instruction command to instruct the navigation device to increase the map scale, and so on.

In S108, the display in the projection display portion 34 is changed and the process proceeds to S109. By the process in S108, the present value set in the in-vehicle device 140 as an operation target is displayed in the projection display portion 34. In S109, the determination block 82 determines whether a predetermined time has elapsed from the correlation of the gesture with the incremental changing operation. Herein, the correlation of the gesture with the incremental changing operation is made under the positive determination in S101. When a negative determination is made in S109, the process returns to S106 to continue to accept a gesture input. When the predetermined time has elapsed and a positive determination is made in S109, the process proceeds to S110. In S110, the right luminous region 36 is turned off by stopping the application of current to the right-ring light source 76 started in S105 and the process returns to S101.

In the process in and after S111 according to the positive determination in S102, a gesture of the fingertip is correlated with a decremental changing operation. In S111, the light source driving unit 81 starts to apply current to the left-ring light source 77 so that the left luminous region 37 become luminous, and then the process proceeds to S112. In S112, the determination block 82 determines whether a gesture is detected similar to S103 and S106. When a negative determination is made in S112, the process proceeds to S115 without executing process in S113 and S114. On the other hand, when a positive determination is made in S112, the process proceeds to S113.

In S113, the controller 80 performs output process to output an instruction signal, which instructs a change of the setting in the in-vehicle devices 140, to the in-vehicle LAN 130 similar to S107, and the process proceeds to S114. Instruction commands outputted in the output process in S113 include an instruction command to instruct the air conditioning device to lower the preset temperature, an instruction command to instruct the audio device to repeat the currently playing song from the beginning or to skip the currently playing song to the one before, an instruction command to instruct the navigation device to reduce the map scale, and so on.

In S114, the display in the projection display portion 34 is changed and the process proceeds to S115. By the process in S114, the present set value in the vehicle device 140 as an operation target is displayed in the projection display portion 34. In S115, the determination block 82 determines whether a predetermined time has elapsed from the correlation of the gesture with the decremental changing operation. Herein, the correlation of the gesture with the decremental changing operation is made according to the positive determination in S102. When a negative determination is made in S115, the process returns to S112 to continue to accept a gesture input. When the predetermined time has elapsed and a positive determination is made in S115, the process proceeds to S116. In S116, the left luminous region 37 is turned off by stopping the application of a current to the left-ring light source 77 started in S111, and the process returns to S101.

In the first embodiment described above, multiple operations to be correlated with a gesture of the finger F of the driver are switched one by one depending on whether the visual line is directed within either one of the visual line detection areas 50. The driver is thus able to perform multiple operations by a single gesture as simple as moving the tip of the finger F combined with a movement of the visual line. Accordingly, the driver is able to make a gesture while holding the steering wheel 110 and the driver is therefore less distracted by making a gesture during driving of the vehicle. Consequently, during driving of the vehicle, driver's attention distraction caused by inputting an operation can be reduced.

Also, in the first embodiment, a selection operation is switched to a changing operation according to a movement of the visual line within either one of the visual line detection areas 50. The driver is thus able to perform a series of both selection operation and changing operation with a simple gesture of the finger F. Hence, the driver's attention distraction can be reduced further.

Further, in the first embodiment, the right visual line detection area 50r and the left visual line detection area 50l are defined so as to include the right-side display device 22 and the left-side display device 23, respectively. Hence, the respective visual line detection areas 50r and 50l can be located closer to a front view than a center console and a center cluster. Hence, it takes a shorter time to complete a motion to move the visual line within either one of the visual line detection areas 50 when switching the selection operation to the changing operation than to complete a motion to move the visual line when visually confirming switches provided to the center console and the center cluster. Because a time the driver has to move the visual line off the front view can be shorter, the driver can readily maintain concentration on the driving even when the driver makes a changing operation during driving of the vehicle.

In the first embodiment, two visual line detection areas 50 are provided. Hence, a same gesture can be correlated with two different changing operations when the visual line is directed within the right visual line detection area 50r and when the visual line is directed within the other left visual line detection area 50l. Consequently, an operability of a changing operation in the lower layer is improved.

In the first embodiment, a single gesture is correlated with changing operations for opposite motions when the visual line is directed within the right visual line detection area 50r and when the visual line is directed within the left visual line detection area 50*l*. The driver is thus able to adjust the present temperature to a desired set value quickly by moving the visual line between the two visual line detection areas 50*r* and 50*l*. Hence, an operability of a changing operation in the lower layer is further improved.

When the two visual line detection areas 50*r* and 50*l* are aligned side by side in the horizontal direction HD as in the configuration of the first embodiment, the driver is able to switch a changing operation to be correlated with a gesture by moving the visual line in the horizontal direction HD. Hence, an operability of a changing operation in the lower layer is further improved.

In the first embodiment, the two visual line detection areas 50*r* and 50*l* are located spaced apart from each other. Hence, an inconvenience that the visual line is detected within the left visual line detection area 50*l* when the driver is intentionally directing the visual line to the right visual line detection area 50*r* or vice versa hardly occurs. Hence, an erroneous detection of a movement of the visual line of the driver is reduced and a changing operation can be switched accurately by a movement of the visual line. Consequently, an operability of a changing operation in the lower layer is further improved.

In the first embodiment, the right-side display device 22 and the left-side display device 23 to display the contents of the respective changing operations are located within the visual line detection areas 50*r* and 50*l*, respectively. Hence, the driver is able to visually confirm the display content on the right-side display device 22 when moving the visual line to the right visual line detection area 50*r*. Likewise, the driver is able to visually confirm the display content on the left-side display device 23 when moving the visual line to the left visual line detection area 50*l*. Accordingly, the driver is able to start a gesture with the understanding of a content of the correlated changing operation. Consequently, the display input apparatus 100 is a user-friendly apparatus and is less likely to distract the driver's attention during the driving of vehicle.

In the first embodiment, once the visual line is moved within the visual line detection area 50*r* or 50*l*, a changing operation is available for a predetermined period of time. Hence, the driver does not have to keep the visual line within the corresponding visual line detection area 50 while performing the changing operation. The driver is thus able to return the visual line to the front view immediately after he moved the visual line within either one of the visual line detection areas. Consequently, the driving of vehicle by the driver is less likely to be distracted by moving the visual line off from the front view.

In the first embodiment, which option is selected is notified by the projection display portion 34 located outside of the two visual line detection areas 50. Hence, when the driver confirms which option is selected by visually confirming the projection display portion 34, the gesture is not correlated with a changing operation. Thus, the driver is able to proceed to a changing operation in the lower layer after confirming whether the intended option is selected correctly.

In the first embodiment, the movement of the visual line within the respective visual line detection areas 50*r* and 50*l* is clearly indicated to the driver, respectively, by the luminous regions 36 and 37 located, respectively, within the visual line detection areas 50*r* and 50*l*. The driver is thus able to start to move the finger F after the driver confirms whether it is a state in which a gesture is correlated with a changing operation. With this configuration, the driver who is to make a gesture feels easy when the respective luminous regions 36 and 37 become luminous as described above.

Thus, the display input apparatus 100 can provide a further user-friendly user interface.

In the first embodiment, the gesture detection area GSA is defined so as to include the rim portion 111 of the steering wheel 110. Hence, even when the driver makes a gesture while holding the steering wheel 110, the gesture detector 74 and the input conversion unit 75 are capable of detecting the gesture in a reliable manner. By increasing a degree of detection of gestures in the manner as above, the driver is able to input a series of a selection operation and a changing operation smoothly without being distracted from driving.

In the first embodiment, the driver is notified by the visual line detection indicator 38 whether the visual line is normally detected by the visual line detector 72 and the visual line conversion unit 73. Likewise, the driver is notified by the gesture detection indicator 39 whether a gesture is normally detected by the gesture detector 74 and the input conversion detector 75. The driver is thus able to perform an operation input by combining a movement of the visual line and a gesture with a sense of easiness after the driver confirms that the visual line and a gesture are detected properly.

The respective indicators 38 and 39 of the first embodiment are located outside of the two visual line detection areas 50. Hence, even when the driver visually confirms states of the respective indicators 38 and 39, switching from a selection operation to a changing operation does not take place. The driver is thus able to start a selection operation to select an option quickly after the driver confirms states of a detection of the visual line detection and a detection of a gesture.

In the first embodiment, the right-side display portion 32 and the left-side display portion 33 correspond to "a content display portion", and the projection display portion 34 corresponds to "a menu display portion". Also, the right luminous region 36 and the left luminous region 37 correspond to "a luminous region", and the visual line detector 72 and the visual line conversion unit 73 correspond to "a visual line detection unit". Further, the gesture detector 74 and the input conversion unit 75 correspond to "a gesture detection unit", the controller 80 corresponds to "a controller", and the determination block 82 corresponds to a "determiner". Furthermore, the display input apparatus 100 corresponds to "a vehicular display input apparatus", the right visual line detection area 50*r* corresponds to "a first visual line detection area", and the left visual line detection area 50*l* corresponds to "a second visual line detection area". In addition, process executed in S101 corresponds to "a first determiner" and process executed in S102 corresponds to "a second determiner".

Second Embodiment

Figure 9:
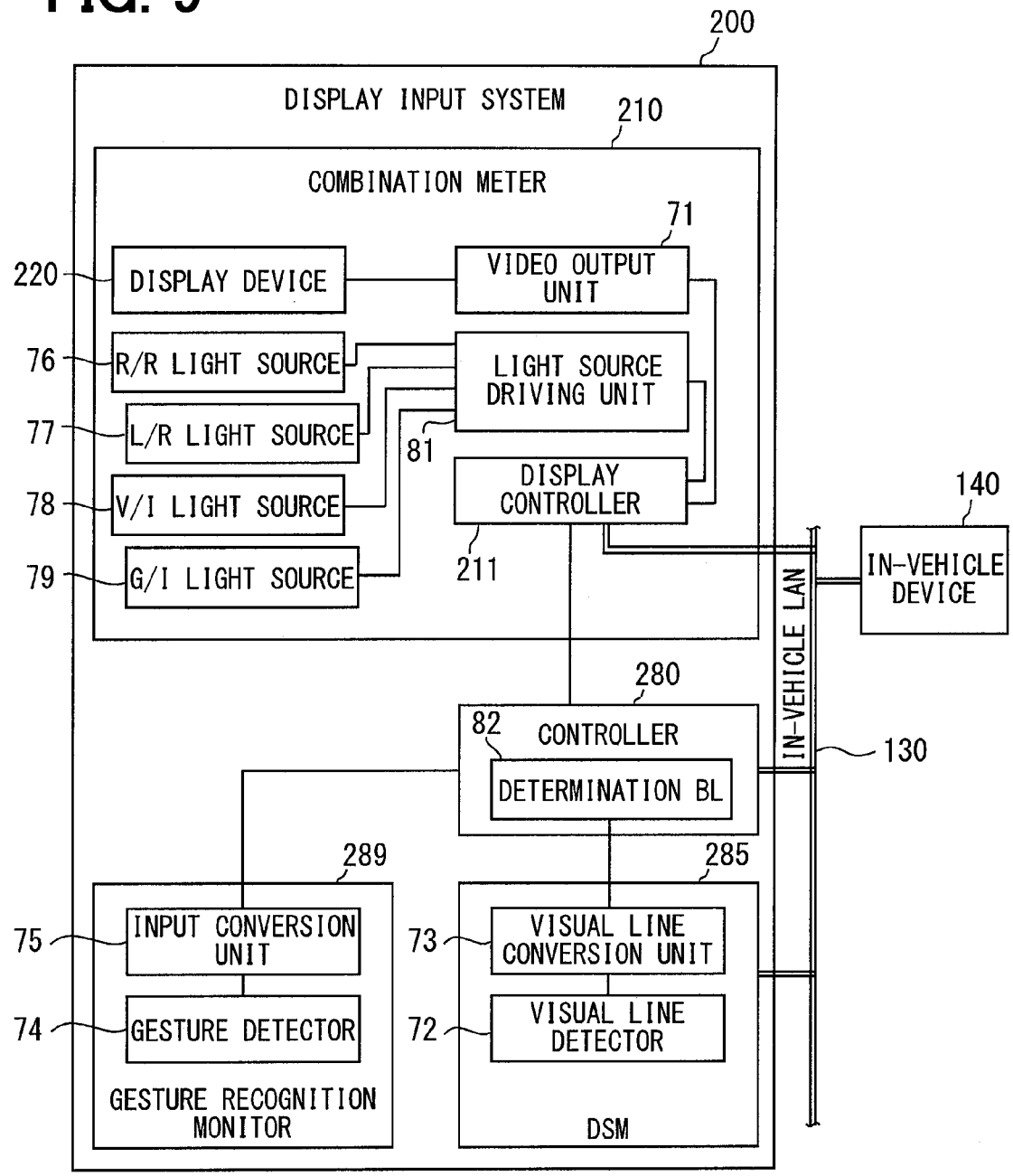
FIG. 9 is a block diagram showing an electrical configuration of a display input system according to a second embodiment of the present disclosure.

A second embodiment of the present disclosure shown in FIG. 9 is a modification of the first embodiment above. A vehicular display input system 200 according to the second embodiment is furnished with a user interface function same as the user interface function furnished to the display input apparatus 100 of the first embodiment above (see FIG. 3). The display input system 200 includes a combination meter 210, a driver status monitor (DSM) 285, a gesture recognition monitor 289, a controller 280, and so on.

The combination meter 210 is a vehicular display device stored in a meter hood 121 (see FIG. 1). The combination meter 210 includes an image output unit 71, light sources 76 through 79, and a light source driving unit 81 similar to the respective counterparts of the first embodiment above. Further, the combination meter 210 includes a display device 220 and a display controller 211.

Figure 3:
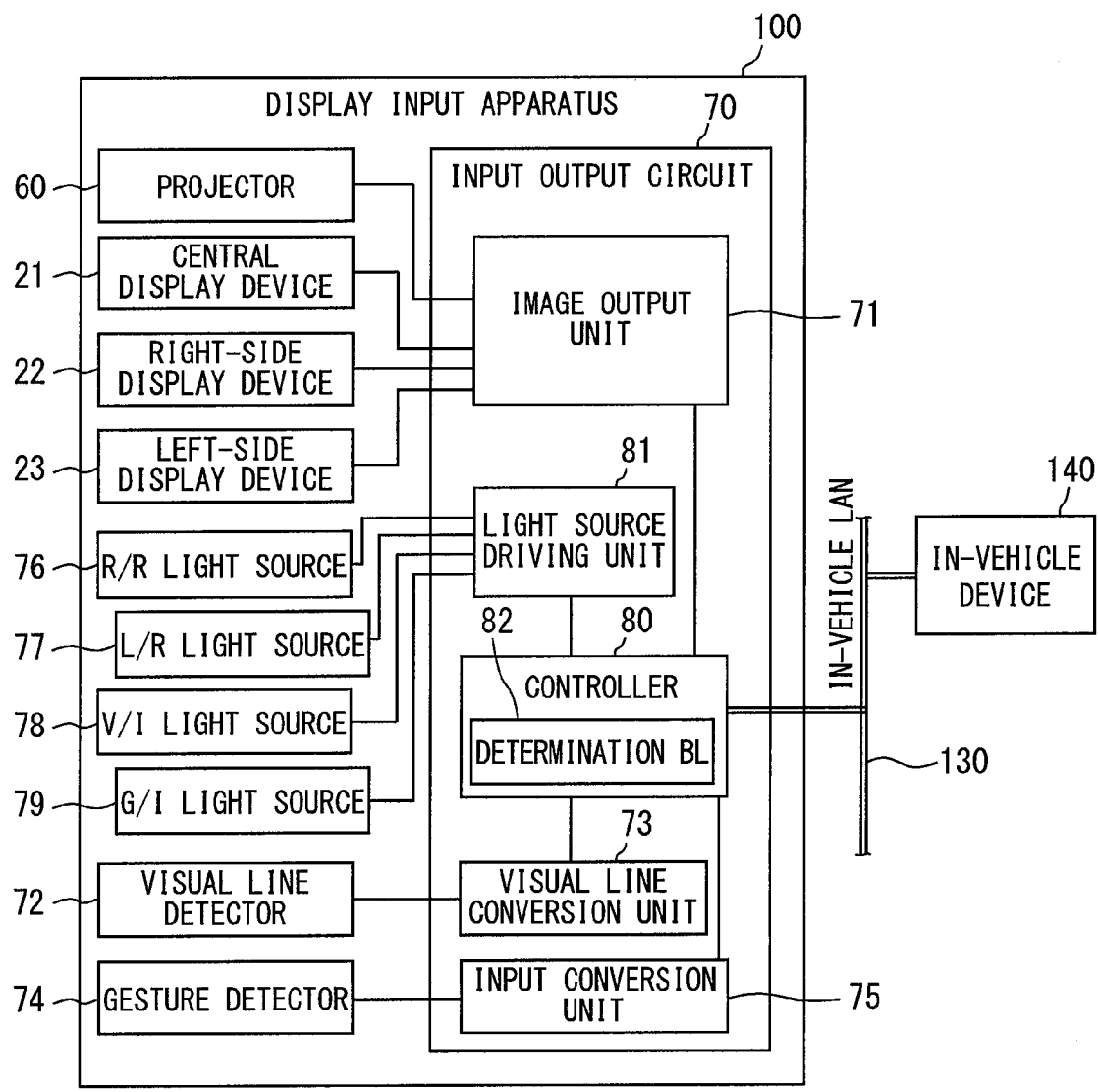
FIG. 3 is a block diagram showing an electrical configuration of the display input apparatus.

The display device 220 is provided by a color liquid crystal display device similar to the respective display devices 21 through 23 of the first embodiment above (see FIG. 3). The display controller 211 includes a microcomputer which executes programs, an interface communicating with an in-vehicle LAN 130, an interface communicating with the controller 280, and so on. The display controller 211 generates a control signal on the basis of various types of information acquired from the in-vehicle LAN 130 and the controller 280, and controls a display on the display device 220 and emission of light from the respective light sources 76 through 79 by outputting the generated control signal to the light source driving unit 81, to the image output unit 71, and the like.

The DSM 285 is a drive assist device that detects inattentive driving and drowsiness on the basis of a direction of a driver's face and motion of eyelids. The DSM 285 is mounted on, for example, a top surface of a steering post. The DSM 285 has a visual line detector 72 and a visual line conversion unit 73 similar to the respective counterparts of the first embodiment above. The DSM 28 successively outputs, to the controller 280, status information indicating whether the visual line is detected by the visual line detector 72, information indicating specified eye point locations, and information indicating a direction of the visual line.

The gesture recognition monitor 289 is a device that recognizes a gesture of a finger F of the driver (see FIG. 4). The gesture recognition monitor 289 is attached to an instrument panel 120 (see FIG. 1) and aligned side by side with the combination meter 210 in a horizontal direction HD (see FIG. 2). The gesture recognition monitor 289 has a gesture detector 74 and an input conversion unit 75 similar to the respective counterparts of the first embodiment above. The gesture recognition monitor 289 outputs status information indicating whether the finger F is detected by the gesture detector 74 and information indicating whether a gesture is made to the controller 280.

The controller 280 includes a microcomputer which executes a program and multiple interfaces. The multiple interfaces communicate with the combination meter 210, the DSM 285, the gesture recognition monitor 289, the in-vehicle LAN 130, and so on. The controller 280 has a determination block 82 similar to the counterpart of the first embodiment above as a functional block. This functional block of the controller 280 is achieved by executing the program. The controller 280 acquires various types of information, namely, information as to a direction of the visual line of the driver and information as to whether a gesture is made, respectively, from the DSM 285 and the gesture recognition monitor 289. The controller 280 generates a control signal on the basis of the acquired information and controls a display of the combination meter 210 and a set value in an in-vehicle device 140 by outputting the generated control signal to the display controller 211 and the in-vehicle LAN 130.

In the display input system 200 according to the second embodiment which includes multiple components as described above, an operation input by combining a movement of the visual line and a gesture can be realized. The driver is thus able to perform both of selection operation and changing operation by a single gesture as simple as moving a tip of the finger F (see FIG. 4). Consequently, an effect of reducing driver's attention distraction same as the effect obtained by the above-described display input apparatus 100 (see FIG. 3) can be achieved.

In the second embodiment, the DSM 285 corresponds to "a visual line detection unit" and the gesture recognition monitor 289 corresponds to "a gesture detection unit". Also, the controller 280 corresponds to "a controller" and the display input system 200 corresponds to "a vehicular display input apparatus".

Other Embodiments

While the embodiments of the present disclosure have been described, it should be appreciated that an interpretation of the present disclosure is not limited by the embodiments above and various other embodiments, either solely or in combination, within the scope of the present disclosure are also included in the present disclosure.

In the embodiments above, a gesture made when the visual line is directed outside the visual line detection areas is correlated with a selection operation and a gesture made when the visual line is directed within either one of the visual line areas is correlated with a changing operation. Alternatively, operations correlated with a gesture depending on a movement of the visual line can be changed to properly suit with a configuration of the operation menu. For example, a gesture made when the visual line is directed within either one of the visual line detection areas may be correlated with a selection operation and a gesture made when the visual line is directed outside the visual line detection areas may be correlated with a changing operation. In a case where the operation menu does not include layers in a hierarchy, a gesture made when the visual line is directed within either one of the visual line detection areas may be correlated with an incremental changing operation, and a gesture made when the visual line is directed outside the visual line detection areas may be correlated with a decremental changing operation.

In the embodiments above, the two visual line detection areas are defined at locations aligned side by side in the horizontal direction HD. Alternatively, only one or three or more visual line detection areas may be defined. Also, a shape and a location of the visual line detection area can be changed as needed as long as at least a part of the display region is included in the visual line detection area.

In the embodiments above, the air conditioner operation mode, the audio operation mode, and the map operation mode are switched sequentially by a selection operation in the higher layer. Alternatively, display modes other than the modes described above may be set as well. For example, a display mode in which an option is an air volume set in the air-conditioning device may be added as another air conditioner operation mode. Also, a display mode in which an option is vents of cold air or hot air set in the air-conditioning device may be added as another air conditioner operation mode.

Further, a display mode in which an option is a volume set in the audio device may be added as another audio operation mode. Alternatively, a display mode in which an option is an operation for an incoming call to a mobile phone equipped to the vehicle may be added. In the incoming phone call operation mode, the driver is able to start a call by making a gesture while directing the visual line within the right visual line detection area. On the other hand, the driver is able to hold an incoming call by making a gesture while directing the visual line within the left visual line detection area.

In the embodiments above, a gesture made when the visual line is directed within the right visual line detection area is correlated with an incremental changing operation. Alternatively, a gesture made when the visual line is directed within the right visual line detection area may be correlated with a decremental changing operation. In such a case, a gesture made when the visual line is directed within the left visual line detection area is correlated with an incremental changing operation.

In the embodiments above, moving the tip of the finger F is detected as the detection target gesture. However, a gesture detected by the gesture detector and the input conversion unit is not limited to the motion specified as above. Various gestures the driver can make while holding the steering wheel can be set as a detection target gesture in the gesture detector and the input conversion unit.

In the embodiments above, the projection display device notifies the driver of which option is selected by displaying a current value of the set option, such as the preset temperature and the track number. However, a content of the display in the projection display device is not limited to the content specified above as long as the driver is notified of which option is selected. For example, when the air conditioner operation mode is selected, a text, such as "temperature setting", may be displayed to clearly and directly indicate the content of option.

In the embodiments above, a changing operation is available for a predetermined period of time after the visual line is moved within either one of the visual line detection areas. It should be noted that the predetermined period of time can be changed as needed, and may be set to 5 seconds or 10 seconds or longer. Alternatively, switching from a changing operation to a selection operation may take place immediately after the visual line is moved to the outside of the visual line detection areas without waiting for the predetermined period of time.

In the embodiments above, when the visual line directed within the right visual line detection area is moved to the left visual line detection area, an operation correlated with a gesture is switched instantaneously from an incremental changing operation to a decremental changing operation. Alternatively, this switching control may not be performed. In such a case, once the process to correlate a gesture with an incremental changing operation starts, process to correlate a gesture with a decremental changing operation may not be performed until a predetermined time elapses.

In the embodiments above, the driver is notified of detection of the visual line within the right and left visual line detection areas by illuminating the right and left luminous regions, respectively. A shape and a luminescent color of the luminous regions can be changed as needed. Alternatively, the luminous regions may be omitted. In such a case, it is preferable to notify the driver of detection of the visual line within either one of the visual line detection areas by changing background colors of the right and left-side display devices or by letting the right and left-side display devices blink.

In the embodiments above, the driver is notified of whether a gesture and the visual line are detected properly by changing luminescent colors of the corresponding indicators. Alternatively, in a case where status information on detection of a gesture and detection of the visual line is displayed in, for example, the central display device or the projection display device, the respective indicators may be omitted.

In the embodiments above, a gesture is detected by the gesture detector using near infrared light. Alternatively, the configuration and the control to detect a gesture can be changed as needed. For example, a capacitance sensor may be provided to the steering wheel to detect a motion of the fingertip in the vicinity of the rim portion.

In the embodiments above, the gesture detector mainly detects a gesture of the right hand. Alternatively, the location of the gesture detector may be changed to mainly detect a gesture of the left hand. Further, by using multiple gesture detectors, both of a gesture of the right hand and a gesture of the left hand may be detected.

In the embodiments above, the driver's focus point is found by calculating the eye point locations and a direction of the visual line using a near infrared image captured by a near infrared camera. Alternatively, the configuration and the control to detect the visual line as above can be changed as needed. Further, the configuration to detect the visual line may also serve as the configuration to detect a gesture.

In the embodiments above, functions, such as "the controller" and "the determination block" provided by the controller or the controller executing a program may be provided by hardware or software of configurations different from the configurations described above, either solely or in combination. For example, the function as "the determination block" may be provided by the control circuit provided to the DSM. Further, the functions specified above may be furnished by a circuit performing a predetermined function without executing a program.

What is claimed is:

1. A vehicular display input apparatus equipped to a vehicle, wherein the vehicular display input apparatus displays vehicle information in a display region and enables a driver of the vehicle to input an operation among a plurality of operations listed in an operation menu, the vehicular display input apparatus comprising:
a gesture detection unit detecting a gesture made by a hand of the driver;
a determiner determining whether a visual line of the driver is directed within a visual line detection area, wherein the visual line detection area is preliminarily defined to include at least a part of the display region; and
a controller switching to one of the plurality of operations listed in the operation menu, which is to be correlated with the gesture, according to a determination result of the determiner, wherein the determination result indicates whether the visual line is directed within the visual line detection area, wherein
the operation menu includes a plurality of layers in a hierarchy,
when the determiner determines that the visual line is not directed within the visual line detection area, the controller correlates the gesture with a selection operation defined in a higher layer of the operation menu, and the selection operation is an operation for selecting one of a plurality of options provided in the higher layer, and
when the determiner determines that the visual line is directed within the visual line detection area, the controller correlates the gesture with a changing operation in a lower layer of the operation menu, and the changing operation is an operation for changing a content of the option selected in the higher layer.

2. The vehicular display input apparatus according to claim 1, wherein
the visual line detection area includes a first visual line detection area and a second visual line detection area defined at different locations, and the determiner has a first determiner determining whether the visual line is directed within the first visual line detection area and a second determiner determining whether the visual line is directed within the second visual line detection area.

3. The vehicular display input apparatus according to claim 2, wherein
the controller correlates the gesture with an incremental changing operation which increases a preset value of the option that is selected under a condition that the visual line is directed within the first visual line detection area, and
the controller correlates the gesture with a decremental changing operation which decreases the preset value of the option that is selected under a condition that the visual line is directed within the second visual line detection area.

4. The vehicular display input apparatus according to claim 2, wherein
the first visual line detection area and the second visual line detection area are defined at the different locations which are aligned side by side in a horizontal direction of the display region.

5. The vehicular display input apparatus according to claim 2, wherein
the first visual line detection area and the second visual line detection area are defined at the different locations which are spaced apart from one another.

6. The vehicular display input apparatus according to claim 1, wherein
the display region has a content display portion located within the visual line detection area, and the content display portion displays a content of the changing operation when the visual line is directed within the visual line detection area.

7. The vehicular display input apparatus according to claim 1, wherein
the controller continues a control which correlates the gesture with the changing operation for a predetermined period of time under a condition that the visual line is directed within the visual line detection area.

8. The vehicular display input apparatus according to claim 1, wherein
the display region has a menu display portion located outside of the visual line detection area, and the menu display portion notifies the driver of the option selected in the higher layer.

9. The vehicular display input apparatus according to claim 1, further comprising:
a luminous region located within the visual line detection area, wherein the luminous region becomes luminous under a condition that the visual line is directed within the visual line detection area.

10. The vehicular display input apparatus according to claim 1, wherein
the gesture detection unit detects the gesture within a gesture detection area preliminarily defined to include a rim portion of a steering wheel of the vehicle.

11. The vehicular display input apparatus according to claim 1, further comprising:
a visual line detection unit detecting the visual line of the driver; and
a visual line detection indicator notifying whether the visual line is detected by the visual line detection unit.

12. The vehicular display input apparatus according to claim 1, further comprising:
a gesture detection indicator notifying the driver of whether the hand of the driver is detected by the gesture detection unit.

* * * * *